Figure 1:
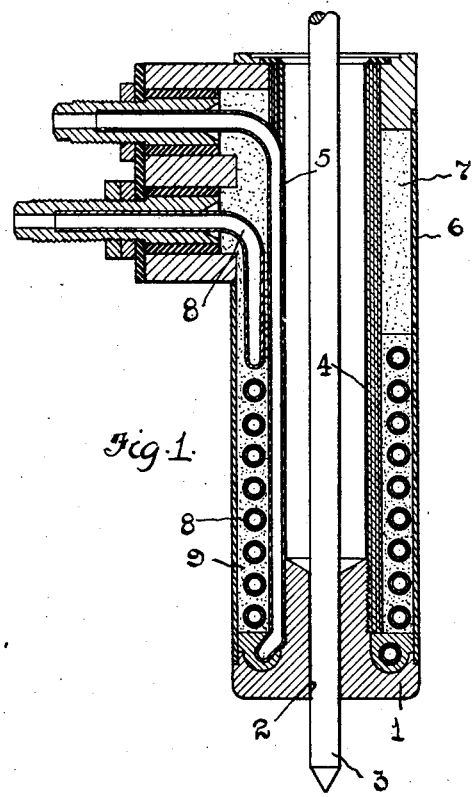

May 2, 1933.  W. E. STINE ET AL  1,906,496
ELECTRIC ARC CONTROL
Filed May 27, 1930  2 Sheets-Sheet 1

INVENTORS
Wilmer E. Stine and
Emmett A. Smith
BY
Fay, Oberlin & Fay
ATTORNEYS.

INVENTORS
Wilmer E. Stine and
Emmett A. Smith
BY Fay, Oberlin & Fay
ATTORNEYS.

Patented May 2, 1933

1,906,496

UNITED STATES PATENT OFFICE

WILMER E. STINE AND EMMETT A. SMITH, OF CLEVELAND, OHIO, ASSIGNORS TO THE LINCOLN ELECTRIC COMPANY, A CORPORATION OF OHIO

ELECTRIC ARC CONTROL

Application filed May 27, 1930. Serial No. 456,133.

Our invention, relating as indicated to electric arc control, has among its objects the provision of methods of and apparatus for controlling the welding arc, whether such arc be struck by means of a carbon or metallic electrode. One of the undesirable characteristics of the welding arc is that such arc has a tendency to be erratic in its behavior when struck between the welding electrode and the work to be welded. Some of the causes for the erratic behavior of the welding arc may be briefly summarized as follows:

Air currents which are usually present at all times in connection with the welding operation, have a tendency to blow the arc laterally as the arc is struck between the electrode and the work. As the arc traverses along the seam to be welded, due to the unequal consistency of the metal or other reasons, so-called "hot spots" will be formed, that is, some areas along the welding seam will be hotter than others. The arc, as it is caused to traverse the seam, has a tendency to adhere to such hot spots so that a uniform relative motion between the arc and the work is not affected as the electrode moves along the seam. Unsymmetrical magnetic permeability of the space in the vicinity of the arc, which may be caused by the unwelded seam between the articles to be welded, or magnetic material such as clamps or other structural material having magnetic properties, when in the vicinity of the arc, will effect such permeability and cause the arc to move to the position in which it will link with the greatest amount of magnetic flux. It has been found that the direction in which the current flows in the work has a definite relationship to the behavior of the arc, that is, by controlling the direction in which the current flows in the work the arc may be caused to blow in any required direction. When the article to be welded is formed of magnetic material, the uneven thickness of such magnetic material has a definite effect on the arc, causing it to move at an uneven rate of speed as the electrode is moved along the seam to be welded. Similarly, any unevenness, such as ribs, laps, corners, et cetera, or the filler rod which may be layed on the seam, will cause an erratic movement of the welding arc. A further source of disturbance of the arc resides in the formation of gases which may be formed by the ignition of fluxes or may be expelled from the molten electrode or work.

In the light of the above-named conditions which effect the stability of the welding arc, it is apparent that if no means is provided for steadying such arc, uniform relative motion of the arc with respect to the work will not be had as the welding electrode moves along the seam. The method of and mechanism for controlling the arc comprising our invention contemplates the establishment of a magnetic field substantially parallel to the desired direction of flow of the current in the welding arc, such magnetic field being of sufficient magnitude to overcome any of the above-named disturbing influences, so that the arc is at all times maintained in a stable condition and caused to travel at a uniform rate along the seam.

A further object of our invention is to provide a method of and apparatus for controlling the arc which shall produce a magnetic field of such magnitude and direction, with respect to the welding arc, that such arc will be blown in a predetermined direction laterally from its normal position in axial alignment with the welding electrode.

Our invention specifically contemplates the employment of alternating or pulsating current as the means for producing the magnetic field by means of which the welding arc is stabilized and controlled. By employing alternating or pulsating current for the purpose of maintaining the magnetic field whereby the arc is stabilized and controlled, whether the welding current be direct current, pulsating current, or alternating current, numerous advantages will result from the use of such alternating current, which advantages may briefly be summarized as follows, by comparing such results with those obtained by the use of direct current for producing such magnetic field:

The constant uni-directional magnetic field set up by a direct current parallel to the welding electrode will combine with the circular magnetic field set up by the welding current flowing in the arc and in the welding electrode, so as to form a spiral magnetic field which will produce a lateral movement of the arc with respect to the electrode when areas of unsymmetrical magnetic permeability are approached as the electrode traverses the seam. When a magnetic field produced by an alternating current is employed, such magnetic field, combining with the circular magnetic field of the electrode and the arc, will produce a reversing spiral magnetic field of varying pitch around the arc which entirely eliminates any tendency to cause a lateral movement of the arc in areas of unsymmetrical magnetic permeability. The welding arc can be properly stabilized and controlled by a relatively strong parallel alternating magnetic field without an accompanying high-pitched noise, which is incidental to the control by a parallel uni-directional magnetic field. By employing a magnetic field produced by an alternating current for stabilizing and controlling the arc, the action of such alternating field will cause a uniform disturbance or working of the molten metal in the arc area and, consequently, produce a resultant weld of superior quality.

The further advantages of the employment of a pulsating or alternating magnetic field substantially parallel to the desired direction of current flow are believed to be obvious to those familiar with the art in the light of the above statements, so that a further enumeration of the advantages of this type of field is believed unnecessary. To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

Figure 2:
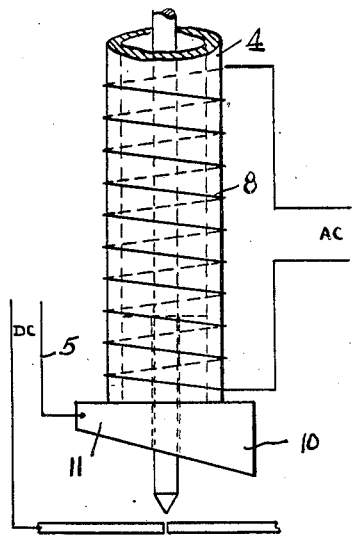
Figure 3:
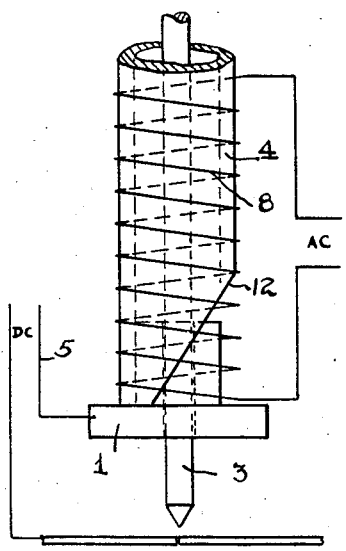
Figure 4:
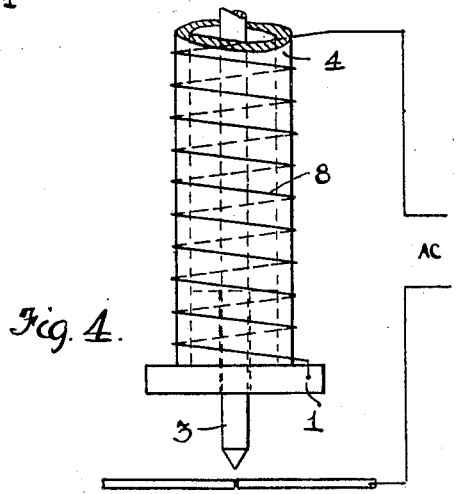
Figure 5:
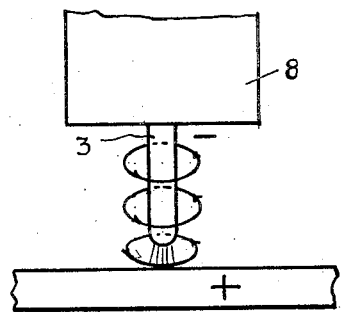
Figure 6:
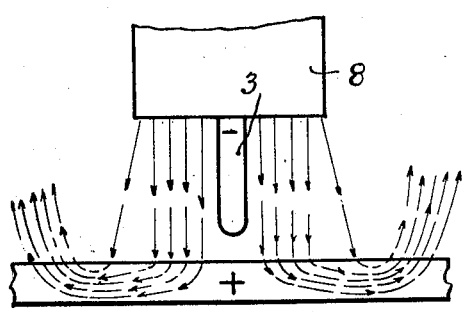
Figure 7:
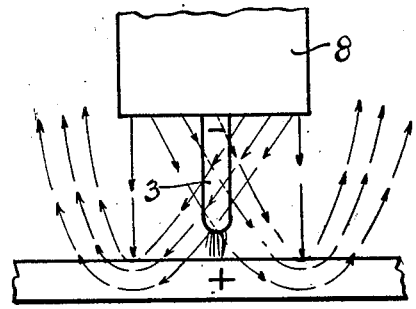
Figure 8:
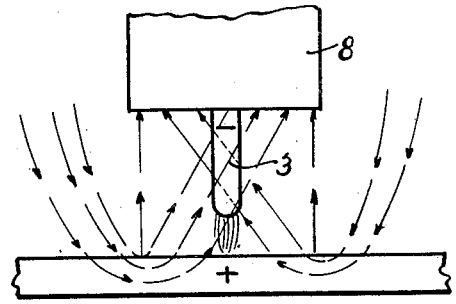

In said annexed drawings:

Fig. 1 is a fragmentary transverse sectional view of the electrode holder and associated mechanism comprising one embodiment of our invention; Fig. 2 is a fragmentary, somewhat diagrammatic view of an alternative form of construction, showing specifically a modified form of construction of the lower terminal of the electrode supporting means; Fig. 3 is a view similar to Fig. 2, showing a modification in the construction of the laminated core on which the coil for producing the magnetic field is wound; and Fig. 4 is a view similar to Figs. 2 and 3, showing the adaptation of an alternating welding current to one form of the mechanism comprising our invention. Fig. 5 is a fragmentary elevational view showing the electrode presented in arcing relation to the work with an illustration of the magnetic field around the electrode resulting from the current flowing therethrough; Fig. 6 is a view showing apparatus similar to that illustrated in Fig. 5 but illustrating the magnetic field produced by current flowing in the coil around the electrode; Fig. 7 is a view similar to Fig. 5 showing the resultant magnetic field produced by the combination of the field illustrated in Figs. 5 and 6; and Fig. 8 is a view in which the illustrated magnetic field is a result of the field about the electrode as illustrated in Fig. 5 and a field like that illustrated in Fig. 6 but of opposite direction.

Referring more specifically to the drawings and more especially to Fig. 1, the structure here illustrated consists of a substantially cylindrical terminal portion 1 which is centrally apertured as at 2, in which is frictionally secured a welding electrode 3. The element 1, in the description which is to follow, will, for purposes of convenience, be termed the "tip" of the holder. The tip 1 has coaxially mounted therewith and axially extending therefrom a laminated iron core 4 which is slotted on one side to receive a conductor 5, a continuation of which is arranged in a helically wound coil 8 on the laminated iron core 4, the lower turn of such coil being in electrical contact with the "tip". The lead 5 serves as a common return for the welding current, and the current employed to establish the magnetic field as well as a conduit for a cooling fluid in the manner hereinafter more fully explained. The tip 1 and the laminated core 4 have co-axially mounted therewith a shell 6 which is of such diameter that an annular space 7 is formed between the laminated core 4 and such shell. In the annular space 7 is positioned the spirally arranged conductor 8 which is embedded in suitable insulating material 9 which completely fills such annular space so that a rigid structure having obvious advantages results. The conductors 5 and 8 are in the form of tubes and function as conduits for a suitable cooling fluid which may be caused to circulate through the spirally arranged coil so as to maintain the mechanism at a proper working temperature. In connection with the modifications of this particular form of construction which are about to be described, it should be noted that separate circuits are employed for the welding current and the magnetic field-producing current instead of the common return arrangement illustrated in Fig. 1.

As most clearly shown in Fig. 2, the tip 1 which is formed of material having relatively high electrical conductivity may be formed thicker on one side, as at 10, than on the other side, as at 11, so as to produce a condition of unsymmetrical magnetic permeability around the arc area and, when this condition occurs, the arc will be blown in the direction hereinbefore described.

As illustrated in Fig. 3, the lateral displacement of the arc away from its axial alignment with the electrode may be effected by cutting away a portion of the laminated iron core 4, as at 12, so that here again a condition of unsymmetrical magnetic permeability is produced, which will cause the arc to be blown in a definite direction laterally from its normal position in axial alignment with the welding electrode.

In Fig. 4 is diagrammatically illustrated the embodiment of the principles comprising our invention in which an alternating welding current is employed. When an alternating welding current is employed, the alterating magnetic field may be produced by having one terminal of the welding circuit wound on the laminated core 4 and terminally connected to the tip 1. In this form of construction, the other side of the welding circuit is connected to the work so that when an arc is established between the work and the electrode the alternating or pulsating magnetic field will at once be established for the purpose of controlling and establizing the arc in the manner hereinbefore explained.

In connection with Figs. 2, 3 and 4, it will be noted that only so much of the mechanism as is necessary to an understanding of the principles comprising our invention has been illustrated, and that somewhat diagrammatic in form to more clearly represent the structures for accomplishing the above-named desirable results.

The nature of the magnetic fields present in the arc area, it is believed, will be more clearly understood by having reference to Figs. 5 to 8, both inclusive. When an electrode such as 3 is presented in arcing relation to the work with the incoming current entering the work and passing through the arc to the electrode, the field produced by such current flowing in the electrode will be in the direction illustrated by the arrows in Fig. 5.

It will be noted that inasmuch as the electrode is presented substantially normally to the plane of the work, the plane of the lines of flux about the electrode will be substantially parallel to the work.

In Fig. 6 is illustrated the field which is produced by the current flowing in the coil 8 around the electrode when the current therein flows in a predetermined direction. As illustrated in this figure, the lines of flux are substantially parallel to the electrode, i. e., the working end thereof, and flow through the work in the manner illustrated.

When the two flux fields such as are illustrated in Figs. 5 and 6 are combined, that is when direct current is flowing through the electrode and alternating current is flowing through the coil 8, the resultant magnetic field will be in the form of a spiral about the axis of the electrode. The pitch and direction of this spiral will depend upon the direction of the lines of force of the field illustrated in Fig. 8 and the magnitude of such field. When alternating current is employed as above specified and as the value of current in the coil 8 varies from zero to a maximum, the angle of the spiral will vary accordingly so that the alternating current in the coil 8 will, as above specified, produce a resultant magnetic field which is spiral in form and of varying pitch.

When the direction of the current reverses in the field 8 accordingly the direction of the lines of flux will vary and the direction of the spiral resultant magnetic field will be opposite to that illustrated in Fig. 7. This spiral which is opposite to that illustrated in Fig. 7 is illustrated in Fig. 8.

In the light of the above it is believed to be clear to those familiar with the art that the employment of alternating current in the coil about the electrode, when direct current is employed for the purpose of carrying on the welding operation, will produce a resultant magnetic field for the purposes specified which is spiral in form and variable as to pitch and direction.

A further description of the methods and apparatus comprising our invention is believed unnecessary for those familiar with the art of electric welding, suffice it to say that numerous minute changes may be made in the detailed forms of construction herein described for purposes of illustration, without departing from the principles of our invention.

Other modes of applying the principles of our invention may be employed instead of the one explained, change being made as regards the means and the steps herein disclosed, provided those stated by any of the following claims or their equivalent be employed.

We therefore particularly point out and distinctly claim as our invention:—

1. In mechanism for electric arc welding, the combination with means for supporting the welding electrode, a welding current lead secured to said supporting means, a core of magnetic material around such electrode, a coil terminally connected to a separate source of power and wound on said core for maintaining a magnetic field around such electrode, and means associated with said electrode supporting means for effecting unsymmetrical magnetic permeance around the welding arc.

2. In electric arc welding mechanism, the combination with means for supporting the welding electrode, a conductor for the welding current secured to said supporting means, a core of magnetic material mounted coaxially with said electrode, a coil on said core for establishing a pulsating magnetic field around said electrode, and means associated with said electrode supporting means for effecting unsymmetrical magnetic permeance around the welding arc.

3. In electric arc welding mechanism, the combination with means for supporting the welding electrode, a lead for the welding current secured to said supporting means, a core of magnetic material mounted coaxially with said electrode, a current carrying coil wound on said core for establishing a magnetic field around said electrode, and a portion of said core cut away on one side thereof to effect unsymmetrical magnetic permeance around the welding arc.

4. In metal working by electricity, the steps which consist in establishing an arc between the work and a suitable electrode of non-magnetic material, maintaining about said arc a magnetic field in addition to that produced by the flow of welding current in the arc and electrode, said magnetic field arranged to laterally enclose the arc and thread the pool of molten metal in angular relation to the flow of welding current therein, and rapidly reversing the relative direction of welding current flow in the pool and the direction of flux in said field threading said pool.

5. In metal working by electricity, the steps which consist in establishing an arc between the work and an electrode of non-magnetic material, maintaining about said arc a magnetic field in addition to that produced by the flow of welding current in the arc and electrode, said magnetic field arranged to laterally enclose the arc and thread the pool of molten metal, and rapidly changing the relative direction of welding current flow and direction of flux in said field.

Signed by us this 21st day of May, 1930.

WILMER E. STINE.
EMMETT A. SMITH.